United States Patent [19]

Harada

[11] Patent Number: 4,586,645

[45] Date of Patent: May 6, 1986

[54] WINDING MACHINE FOR COIL BOBBINS

[75] Inventor: Mamoru Harada, Toda, Japan

[73] Assignee: Towa Nittoku Engineering Kabushiki Kaisha, Saitama, Japan

[21] Appl. No.: 574,292

[22] Filed: Jan. 26, 1984

[30] Foreign Application Priority Data

Feb. 7, 1983 [JP] Japan ............................ 58-17318[U]
Feb. 7, 1983 [JP] Japan ............................ 58-17319[U]

[51] Int. Cl.[4] ............................................ B23K 37/00

[52] U.S. Cl. .................................. 228/15.1; 29/33 F; 29/650; 242/7.11

[58] Field of Search .......................... 228/15.1, 173 E; 29/605, 33 B, 33 F, 33 K, 650; 242/7.09, 7.11

[56] References Cited

U.S. PATENT DOCUMENTS

| | | | |
|---|---|---|---|
| 3,011,729 | 12/1961 | Scholten | 242/7.09 |
| 3,136,493 | 6/1964 | Swanson | 242/7.09 |
| 3,811,630 | 5/1974 | Muskulus et al. | 242/7.11 |
| 3,878,602 | 4/1975 | Schubert et al. | 242/7.11 |
| 4,142,289 | 3/1979 | Roethke | 29/605 |
| 4,357,742 | 11/1982 | Fisher | 29/33 F |

*Primary Examiner*—Nicholas P. Godici
*Assistant Examiner*—K. Rowan
*Attorney, Agent, or Firm*—Frishauf, Holtz, Goodman & Woodward

[57] ABSTRACT

A winding machine for coil bobbins in which a one-piece or divided index carriage is reciprocally movable in its axial direction and reversibly rotatable about the axis. A plurality of slide plates are supported on the carriage for reciprocally slidable movement axially along the carriage and equally angularly spaced from each other, a plurality of bobbin mount jigs project outwardly in one row from each of the slide plates in equally spaced relationship, and a plurality of part guide members corresponding in number to the number of the bobbin mount jigs are provided to guide wire onto and about bobbins loaded on the bobbin mount jigs. A common soldering unit solders wire to the bobbins, a common bobbin feed unit is provided to feed bobbins to the jigs, a product discharge mechanism discharges complete full coil bobbins from the machine and a cut unit is optionally provided to cut wire to a predetermined length.

9 Claims, 4 Drawing Figures

WINDING MACHINE FOR COIL BOBBINS

BACKGROUND OF THE INVENTION

This invention relates to a winding machine for coil bobbins and more particularly, to a winding machine for minute coil bobbins which are adapted to be mounted on the base plates of microcomputer chips or the like and suitably employed as electronic parts of such devices. A variety of winding machines for such purpose have been conventionally proposed and practically employed, and the winding machine of such type usually requires part or bobbin transport mechanisms and soldering machanisms, respectively, corresponding in number to a plurality of bobbin mount jigs arranged in a row on the index carriage which moves reciprocally in the axial direction thereof and rotates in forward and reverse directions about the axis thereof. And since the bobbin mount jigs are adapted to be rotated by a chain so as to present the bobbins loaded thereon to different steps, the direction in which the jigs move the bobbins for processing is limited and in an extreme case, a so-called dead space is formed which results in a large size machine and requires a large space for installation. The provision of the bobbin transport mechanisms in a number corresponding to that of the bobbin mount jigs may inflict damages to the bobbins while they are transferred from one transport mechanism to another.

SUMMARY OF THE INVENTION

Therefore, the purpose of the present invention is to provide a winding machine of the above type which can effectively eliminate the above-mentioned disadvantages inherent in the conventional winding machines.

Another object of the present invention is to provide a winding machine of the type which includes a simplified transport system so as to simplify the bobbin transfer operation and eliminate possible damage of the bobbins being handled, which allows the bobbins to be processed in multi directions and which is inexpensive resulting in less expensive full coil bobbins.

According to one aspect of the present invention, there has been provided a winding machine for coil bobbins which essentially comprises a cylindrical index carriage reciprocally movable in the axial direction and reversibly rotatable about the axis, a plurality of slide plates supported on said carriage in equally angular spaced relationship about the carriage for reciprocal movement in the axial direction of said carriage, a plurality of bobbin mount jigs projecting outwardly in a row from each of said slide plates in equally spaced relationship, winding flyers corresponding in number to the number of said bobbin mount jigs in one row, a common soldering unit, a common part feed mechanism and a product discharge mechanism.

According to another aspect of the present invention, there has been provided a winding machine for coil bobbins which essentially comprises a cylindrical index carriage consisting of two portions divided in the longitudinal direction of said carriage and reciprocally movable in the axial direction and reversibly rotatable about the axis, a plurality of slide plates supported on each of said carriage portions in angular spaced relationship about the associated carriage portion for reciprocal movement in the axial direction of said carriage, a plurality of bobbin mount jigs projecting outwardly in one row from each of said slide plates, a plurality of bar members corresponding in number to the number of said bobbin mount jigs, a part feed unit, a cut unit and a soldering unit.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

The accompanying drawings illustrate two preferred embodiments of the winding machine constructed in accordance with the principle of the present invention in which.

PREFERRED EMBODIMENTS OF THE INVENTION

Figure 1:
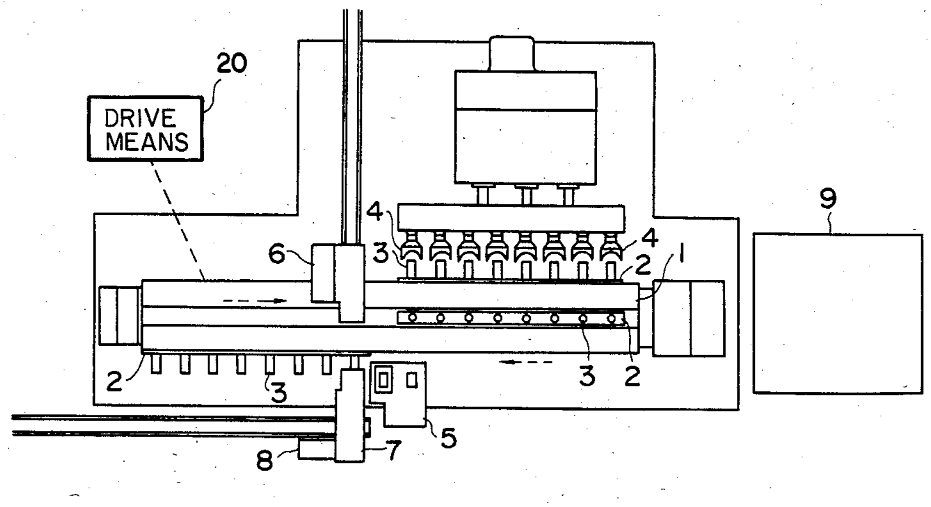
FIG. 1 is a top plan view of a first embodiment of the winding machine of the invention.
Figure 2:
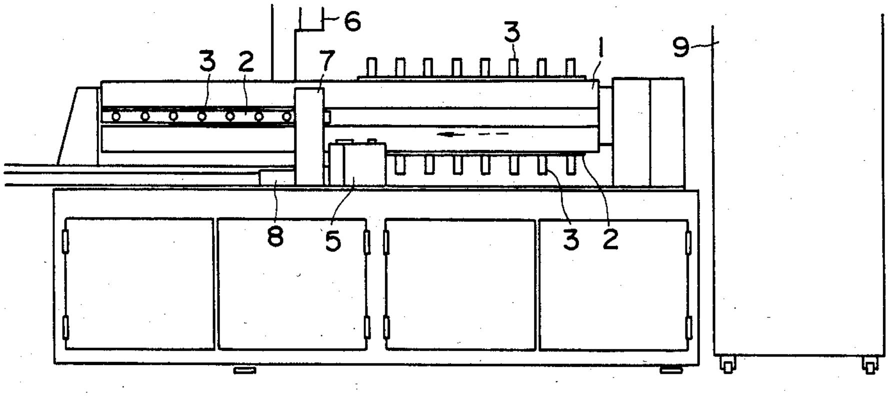
FIG. 2 is a side elevational view of said winding machine as shown in FIG. 1.

The present invention will be now described referring to the accompanying drawings and more particularly to FIGS. 1 and 2 thereof in which the first embodiment of the winding machine of the invention is shown. In FIGS. 1 and 2, a cylindrical index carriage 1 is reciprocally movable in the axial direction and reversibly rotatable about the axis, and four slide plates 2, 2 . . . (only three of the slide plates are shown) are supported by suitable means (not shown) about the outer periphery of the carriage in angularly spaced relationship to each other by 90° for slidable movement along the carriage in the axial direction thereof. The slide plates 2 have a length slightly smaller than that of one half of the full length of the index carriage 1 and each of the slide plates 2 includes a plurality of equally spaced bobbin mount jigs 3, 3 . . . (eight jigs in the illustrated embodiment) attached thereto and extending outwardly therefrom at right angles to the plane of the associated slide plate. Each of the slide plates 2 is advanced and retracted in increments by means of a ball screw provided for each of the slides in the carriage (not shown) by an amount corresponding to the distance between two adjacent bobbin mount jigs 3 or any multiple of the jig-to-jig distance as desired.

The cylindrical carriage 1 is adapted to be rotated by 90° each time the carriage is driven by a suitable drive means 20 because the slide plates are provided about the carriage by the angular distance of 90° and thus, the slide plates 2 and the bobbin mount jigs 3 supported on the carriage are rotated in synchronization with and by the same angular distance as the carriage 1. A plurality of winding flyers 4, 4 . . . (eight flyers in the illustrated embodiment) are rotatably suspended in a straight row from the machine framework of the winding machine by suitable means and spaced from each other by a distance corresponding to that between two adjacent bobbin mount jigs 3 on each slide plate 2. The single row of flyers 4 is common to the plural rows of the bobbin mount jigs 3.

In FIGS. 1 and 2, a soldering unit 5 is mounted on the machine framework to solder the distal end of wire to be wound about a bobbin mounted on the jig 3 to the mount jigs 3. The winding machine further comprises a part (or bobbin) feed means 6 adapted to feed bobbins into the machine and a product discharge means 7 adapted to discharge complete products or full coil bobbins out of the machine. The operation of the part feed means 6 and product discharge means 7 is controlled by an electronic mechanism (not shown) and robotized. A reject accumulating box 8 and a control box 9 are also shown.

With the above-mentioned construction and arrangement of the components of the winding machine of the present invention, in operation, assuming that the carriage 1 is so positioned that the leading bobbin mount jig 3 of the plurality of bobbin mount jigs 3 on one of the slide plates 2 is disposed at the loading station where the part feed means 6 is positioned, the part supply source (not shown) is actuated to supply one bobbin at one time to the part feed unit 6 which in turn loads the bobbin on the leading bobbin mount jig 3. After the bobbin has been loaded on the leading bobbin jig 3, the one slide plate 2 is advanced along the carriage 1 by the amount corresponding to the distance between adjacent jigs 3 to position the next bobbin mount jig 3 on the same slide plate 2 at the part feed unit 6 which in turn loads the bobbin on the next bobbin mount jig 3. The procedure is repeated until the bobbins are loaded on all the bobbin mount jigs on the same slide plate 2. Thereafter, the index carriage 2 is turned by 90° so as to index the bobbins mounted on the bobbin mount jigs 3 on the first-mentioned slide plate 2 to the wire winding station where the bobbin mount jigs 3 which now have the bobbins loaded thereon are vertically aligned with or disposed right below the respectively associated winding flyers 4 whereupon the wire supply source (not shown) is actuated to pay out the wire therefrom to the bobbin mount jigs 3 through the rotating winding flyers 4 associated with the bobbins on the bobbin mount jigs 3 to wind the wire successively about each bobbin loaded on the leading bobbin mount jig 3. The carriage 1 is then rotated by 90° and the bobbin mount jigs which have the wire wound thereabout are in succession presented to the soldering unit 5 where the distal ends of the wire coils wound about the bobbins are in succession soldered to the bobbins to prevent the coils from unwinding therefrom. The complete products or full coil bobbins having the coils soldered thereto are then transferred to the product discharge unit 7 which in turn discharges the products onto a discharge conveyor (not shown) which runs by the product discharge unit, to be delivered to an external location where the products or complete full coil bobbins are packed for transportation.

While the wire winding operation is performed on the successive bobbin mount jigs 3 on the first-mentioned slide plate in the above-mentioned manner, the second slide plate 2 is so disposed that the successive bobbin mount jigs thereon are loaded with the bobbins by the part feed unit 6 by sliding the second slide plate. Meantime, the rejects or improperly wound bobbins are accumulated in the reject accumulation box 8.

As is clear from the foregoing description of the first embodiment of the winding machine of the present invention, the bobbin transport system extending from the bobbin supply station to the complete full coil bobbin discharge station is a simple linear arrangement without any separate intermediate bobbin handling means as required in the prior art winding machines, which may make the bobbin delivery and discharge operation complicated and inflict damage to the bobbins and the machine is simplified. Furthermore, since the wire wound bobbins on the bobbin mount jigs are incrementally moved by the distance between adjacent bobbin jigs, a single soldering unit for soldering the distal ends of coils of wire after the bobbins have the coils wound on them serves for the plurality of bobbins. In addition, since a single bobbin supply mechanism and a single discharge mechanism also serve the plurality of bobbins, the winding machine is compact and less expensive.

Figure 3:
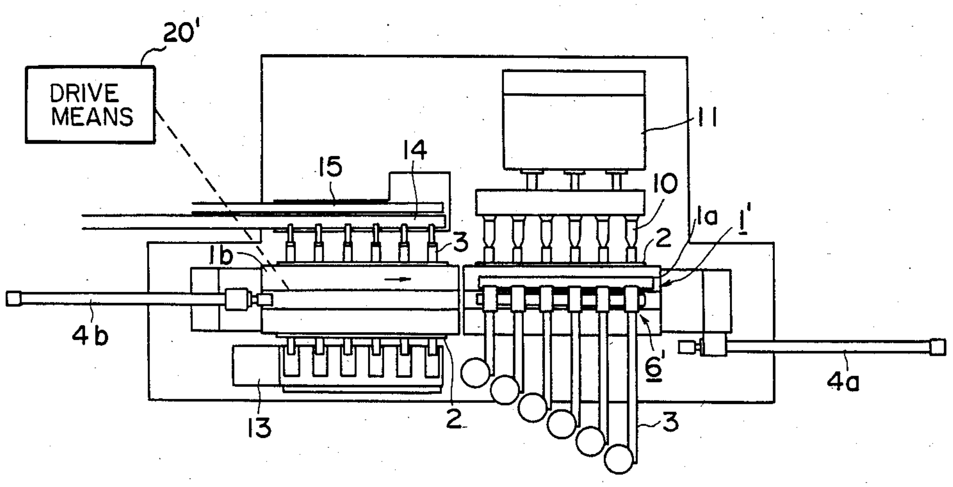
FIG. 3 is a top plan view of a second embodiment of the winding machine of the present invention.
Figure 4:
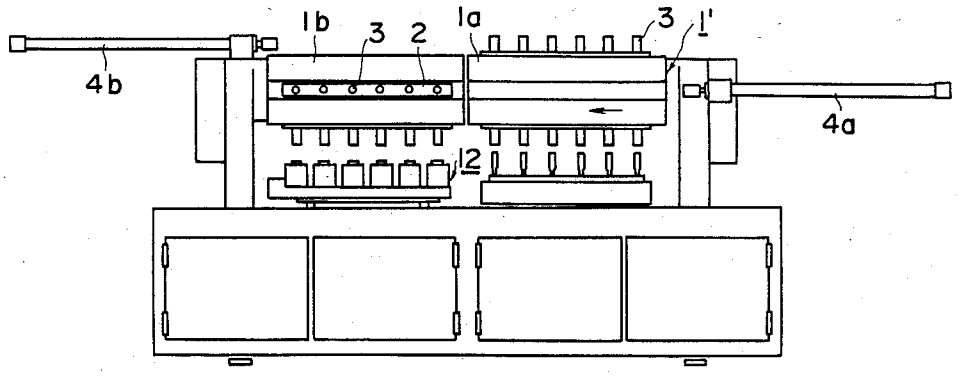
FIG. 4 is a side elevational view of said winding machine as shown in FIG. 3.

Now turning to FIGS. 3 and 4 of the accompanying drawings in which the second embodiment of the winding machine of the invention is shown, a cylindrical carriage 1' is longitudinally divided into a first portion **1*a* and a second portion 1*b* which are reciprocally slidable in the axial direction by drive means 20' and reversibly rotatable about the axis, and four slide plates 2, 2 . . . (only three of the slide plates are shown) are supported by suitable means about the outer periphery of the carriage in angularly spaced relationship to each other by 90° for slidable movement along the carriage in the axial direction thereof with two of the slide plates supported on the first portion 1*a* and the other two supported on the second portion 1*b*. Each of the slide plates 2 includes a plurality of bobbin mount jigs 3 in a row (six jigs in the illustrated embodiment) attached thereto and extending outwardly therefrom at right angles to the plane of the associated slide plate. The slide plates 2 have a length shorter than that of the first and second portions 1*a*, 1*b*** of the carriage.

The carriage first and second portions **1*a* and 1*b* are adapted to be rotated by a predetermined angle or 90° in forward and reverse directions when driven by suitable drive means (not shown). The reciprocal rotation of the carriage first and second portions 1*a* and 1*b* is controlled by guide bars 4*a* and 4*b*** which are operatively connected to the carriage portions, respectively.

Provided in association with the carriage first portion **1*a* are a plurality of winding bars 10, 10 . . . (six winding bars corresponding to the number of the bobbin mount jigs 3 in the illustrated embodiment) in spaced relationship to each other. The space between the adjacent winding bars 10 corresponds to that between adjacent bobbin mount jigs 3. The winding bars 10 are rotatably supported on and hung from a common winding head 11 which is in turn supported on the framework of the winding machine. A part (bobbin) feed unit 6' is provided in the supply station in association with the carriage portion 1*a* in opposition to the winding bars 10 and having a plurality of passages in spaced relationship corresponding to the space between the adjacent bobbin mount jigs 3**.

Provided in association with the carriage portion **1*b* is a soldering unit 12 having a plurality of soldering areas in spaced relationship corresponding to the space between the adjacent bobbin mount jigs 3. The soldering unit 12 is provided with a flux apply means 13 adapted to apply flux to the bobbins before the soldering operation. Furthermore, a product discharge unit 14 is provided in opposition to the soldering unit 12 and a reject discharge conveyor belt 15 is provided in parallel to the product discharge unit 14**.

With the above-mentioned construction and arrangement of the components of the second embodiment of the winding machine of the present invention, in operation, assuming that the first portion **1*a* of the index carriage 1 is so positioned that the plurality of bobbin mount jigs 3 on one of the side plates 2 in the carriage first portion 1***a* are aligned with the part feed areas defined by the passages in the part feed unit 6′ in the bobbin loading station. The part feeder is actuated to feed bobbins to the bobbin loading areas of the part or bobbin feed unit 6′ which in turn load the fed bobbins on the aligned bobbin mount jigs. The carriage first portion 1*a* is rotated by 90° to dispose the bobbins 3 which are now loaded on the bobbin mount jigs 3 of the associated slide plate 2 in the position in which the bobbins are wound with wire and the wire supply source (not shown) is actuated to supply a length of wire to one of the bobbins through the associated rotating wire winding bar 10 to wind the wire about the bobbin. After the winding operation on the one bobbin has been completed, the winding operation is performed on the next bobbin. The same procedure is repeated on the rest of the bobbins loaded on the rest of the bobbin mount jigs 3 of the same slide plate 2 in the carriage portion 1*a*. After the wire winding operation has been completed on all the bobbins which are now disposed in alignment with the winding bars 10, the carriage portion 1*a* is rotated by 90° and the slide plate 2 is slided in increments by the amount corresponding to the space between the adjacent jigs 3 along the index carriage portion 1*a* towards the index carriage portion 1*b*, so as to pass in succession the full coil bobbins by the flux application unit 13 which in turn applies flux to the bobbins prior to soldering. Thereafter, the index carriage portion 1*a* is turned by 90° to align the bobbins with the soldering areas of the soldering unit to solder the distal ends of the coils of wire wound about the bobbins to the bobbins to thereby produce the complete full coil bobbins. The thus produced full coil bobbins are discharged out of the winding machine by the product discharge unit 14 to be transported to an external location to be packed. The rejects or defect bobbins are discharged by the reject discharge unit 15 disposed in parallel to the product discharge unit 14 for disposal.

In the second embodiment of the winding machine of the invention, although the index carriage consists of two portions, the construction of the index carriage is not in any way limited to the two part construction. For example, an additional index carriage may be provided on the left-hand end of the index carriage portion 1*b* and the disposition of the additional index carriage may be suitably selected depending upon the number of rows of bobbin mount jigs and/or the projecting angle of the jigs with respect to the slide plates.

And since the two divided portions of the index carriage are reciprocal in the axial direction and rotational in forward and reverse directions about the axis, the versatility of the winding machine is enhanced and the complete full coil bobbins can be produced one by one at one time as the index carriage advances and retracts by the amount corresponding to the distance between adjacent bobbin mount jigs or simultaneously to thereby enhance the operation efficiency of the winding machine.

As is clear from the foregoing description of the second embodiment of the winding machine of the invention, since the transport system from the supply station of bobbins to the discharge station of complete full coil bobbins in the machine is a simplified arrangement and does not require any separate intermediate complex transfer means as required in the prior art winding machines, the bobbins can be safely transported free of damage. And the limitation of operation direction for bobbin handling can be elimiated by relocating the units.

Furthermore, the winding machine itself is compact and the drive source and control system are also simplified and thus, the cost of the machine is less and the operation efficiency is enhanced. Therefore, the present invention has significant practical advantages and substantially contributes to the art.

While two embodiments of the invention have been shown and described in detail, it will be understood that the same are for illustration purposes only and not to be taken as a definition of the invention, reference being had for this purpose to the appended claims.

What is claimed is:

1. A winding machine for coil bobbins, comprising;

a generally cylindrical index carriage having a carriage axis and drive means for reciprocally moving said carriage in the axial direction and reversibly rotating said carriage about the carriage axis, a plurality of slide plates supported on the outer periphery of said carriage in equally angularly spaced relationship for reciprocally slidable movement in the axial direction of the carriage, a plurality of bobbin mount jigs projecting radially outwardly from each of said slide plates in equally axially spaced relationship, a plurality of wire winding members corresponding in number to the number of the bobbin mount jigs on one of said slide plates, a common soldering unit to solder the distal ends of wire wound about the bobbin mounted on each of said bobbin mount jigs, to the bobbin, a common part feed unit to feed bobbins to said bobbin mount jigs, and a product discharge unit to discharge complete full coil bobbins out of said winding machine.

2. The winding machines as set forth in claim 1, in which said index carriage rotates by 90° at one time and said slide plates are equally spaced by 90° about the outer periphery of the carriage.

3. The winding machine as set forth in claim 1, further including a reject accumulation box into which rejects are discharged.

4. The winding machine as set forth in claim 1, in which said wire winding members are flyers.

5. The winding machine as set forth in claim 1, in which said wire winding members are bar members.

6. The winding machine as set forth in claim 1, further including a control box for controlling the movement of said carriage.

7. A winding machine for coil bobbins, comprising:

a generally cylindrical carriage having a carriage axis and including two axial portions, and drive means for reciprocally moving said carriage in the axial direction and reversibly rotating said carriage about the carriage axis, a plurality of slide plates supported on the outer periphery of said carriage in equally angularly spaced relationship for reciprocal movement in the axial direction of said carriage, a plurality of bobbin mount jigs projecting radially outwardly from each of said slide plates in equally axially spaced relationship, a plurality of wire winding members corresponding in number to the number of the bobbin mount jigs on one of said slide plates, a common soldering unit to solder the distal ends of the wire wound about the bobbin mounted on each of said bobbin mount jigs, to the bobbin, a common part feed unit to feed bobbins to said bobbin mount jigs, a flux apply unit adapted to apply flux to the bobbins before said soldering is performed, a product discharge unit to discharge complete full coil bobbins out of the winding machine, and a reject discharge unit to discharge rejects from the winding machine.

8. The winding machine as set forth in claim 7, in which said index carriage rotates by 90° at one time and said slide plates are equally spaced by 90° about the outer periphery of said carriage.

9. The winding machine as set forth in claim 7, in which said wire winding members are winding bars.

* * * * *